United States Patent [19]

Trankiem

[11] Patent Number: 5,263,256

[45] Date of Patent: Nov. 23, 1993

[54] METHOD OF TREATING RAZOR BLADE CUTTING EDGES

[75] Inventor: Hoang M. Trankiem, Watertown, Mass.

[73] Assignee: The Gillette Company, Boston, Mass.

[21] Appl. No.: 870,364

[22] Filed: Apr. 17, 1992

[51] Int. Cl.$^5$ .............................................. B26B 21/60
[52] U.S. Cl. .............................. 30/346.54; 30/346.5; 76/104.1; 427/388.4; 428/421; 428/422
[58] Field of Search ................... 427/388.4; 30/50, 77, 30/346.5, 346.53, 346.54; 76/104.1; 428/421, 422

[56] References Cited

U.S. PATENT DOCUMENTS

| | | | |
|---|---|---|---|
| 2,937,976 | 5/1960 | Granahan et al. | 167/85 |
| 3,071,856 | 1/1963 | Fishbein | 30/346 |
| 3,518,110 | 6/1970 | Fishbein | 117/93.4 |
| 3,658,742 | 4/1972 | Fish et al. | 260/29.6 F |
| 3,713,873 | 1/1973 | Fish | 117/93.4 R |
| 3,766,031 | 10/1973 | Dillon | 204/159.2 |
| 4,102,046 | 7/1978 | Downing et al. | 30/346.53 |
| 4,220,511 | 9/1980 | Derbyshire | 204/159.2 |
| 5,001,832 | 3/1991 | Althaus | 30/50 |

FOREIGN PATENT DOCUMENTS

| | | |
|---|---|---|
| 0017349 | 10/1980 | European Pat. Off. . |
| 18930 | 12/1991 | PCT Int'l Appl. . |
| 768554 | 2/1957 | United Kingdom . |
| 906005 | 9/1959 | United Kingdom . |
| 1282410 | 7/1972 | United Kingdom . |
| 2119385 | 11/1983 | United Kingdom . |

OTHER PUBLICATIONS

Teflon MP1100 Technical Information, DuPont Polymer Products (Oct. 1990).
Wiley, Encycl. of Polymer Science and Tech. vol. 4, p. 632 (1986).
Kusy et al. J. Pol. Sc., 10, 1745–1864 (1972).

*Primary Examiner*—Anthony McFarlane

[57] ABSTRACT

The present invention relates to an improved method of forming a polyfluorocarbon coating on a razor blade cutting edge comprising the steps of subjecting a fluorocarbon polymer having a molecular weight of at least about 1,000,000 to ionizing radiation to reduce the average molecular weight to from about 700 to about 700,000; dispersing the irradiated fluorocarbon polymer in an aqueous solution; coating said razor blade cutting edge with the dispersion; and heating the coating obtained to melt, partially melt or sinter the fluorocarbon polymer.

18 Claims, No Drawings

1

METHOD OF TREATING RAZOR BLADE CUTTING EDGES

FIELD OF THE INVENTION

This invention relates to an improved method of producing razor blade cutting edges by coating the blade edge with an aqueous polyfluorocarbon dispersion and subsequently heating the polyfluorocarbon. The present method provides good polyfluorocarbon adhesion and blade wear yet eliminates the need to utilize environmentally hazardous solvents.

BACKGROUND OF THE INVENTION

Uncoated razor blades, despite their sharpness, cannot be employed for shaving a dry beard without excessive discomfort and pain, and it is as a practical matter necessary to employ with them a beard-softening agent such as water and/or a shaving cream or soap. The pain and irritation produced by shaving with uncoated blades are due to the excessive force required to draw the cutting edge of the blade through the unsoftened beard hairs, which force is transmitted to the nerves in the skin adjacent the hair follicles from which the beard hairs extend, and, as is well known, the irritation produced by excessive pulling of these hairs may continue for a considerable period of time after the pulling has ceased. Blade coatings were developed to solve these shortcomings.

Granahan et al., U.S. Pat. No. 2,937,976, issued May 24, 1960, describes a "coated" blade which provides a reduction in the force required to cut beard hair. The coating material consists of an organosilicon-containing polymer which is partially cured to a gel which remains adherent to the blade. Although these coated blades met with considerable commercial success, the coatings were not permanent and would wear off relatively quickly.

Fischbein, U.S. Pat. No. 3,071,856, issued Jan. 8, 1963, describes fluorocarbon-coated blades, particularly polytetrafluoroethylene-coated blades. The blades may be coated by (1) placing the blade edge in close proximity to a supply of the fluorocarbon and subsequently heating the blade, (2) spraying blade with a fluorocarbon dispersion, (3) dipping the blade into a fluorocarbon dispersion or (4) by use of electrophoresis. Example 2 shows a blade which is dip-coated with an aqueous colloidal dispersion containing 25% (wt) finely divided solid tetrafluoroethylene polymer (DuPont's Teflon Clear Finish). The resulting blade was later sintered.

Fischbein, U.S. Pat. No. 3,518,110, issued Jun. 30, 1970, discloses an improved solid fluorocarbon telomer for use in coating safety razor blades. The solid fluorocarbon polymer has a melting point between 310° C. and 332° C. and has a melt flow rate of from 0.005 to 600 grams per ten minutes at 350° C. The molecular weight is estimated to be between 25,000 and 500,000. For best results, the solid fluorocarbon polymer is broken down to 0.1 to 1 micron particles. Example 2 discloses an aqueous dispersion of 0.5% polytetrafluoroethylene, PTFE, (Impurities: 0.44% Chlorine and 0.06% Hydrogen), and 0.5% Triton X-100 wetting agent. The dispersion is electrostatically sprayed onto stainless steel blades. Example 8 states that the polymerization of tetrafluoroethylene is achieved in an aqueous dispersion with methyl alcohol as the telogen and ammonium persulfate as the catalyst.

Fish et al, U.S. Pat. No. 3,658,742, issued Apr. 25, 1972, discloses an aqueous polytetrafluoroethylene (PTFE) dispersion containing Triton X-100 wetting agent which is electrostatically sprayed on blade edges. The aqueous dispersion is prepared by exchanging the Freon solvent in Vydax brand PTFE dispersion (PTFE+Freon solvent), distributed by E. I. DuPont, Wilmington, Del., with isopropyl alcohol and then exchanging the isopropyl alcohol with water. Example 1 discloses an aqueous PTFE dispersion containing 0.4% PTFE and 0.1% Triton X-100 wetting agent.

Dillon, U.S. Pat. No. 3,766,031, issued Oct. 16, 1973, incorporated herein by reference, indicates that the application of a critical dose of ionizing radiation to sintered or unsintered polytetrafluoroethylene renders such material capable of being comminuted to microfineness with no adverse heat side effects, and the resulting particles are readily dispersible in diverse media. Such particles possess the extremely low coefficient of friction associated with polytetrafluoroethylene resin. The dosage level of ionizing radiation in accordance with the process of this invention lies within the range of from about 5 megarads to about 25 megarads, and is preferably maintained between about 10 megarads and 25 megarads.

European Application No. 0 017 349, filed Mar. 6, 1980, discloses that sintered polytetrafluoroethylene can be nondestructively degraded so as to be grindable to a powder of an average size of less than 10 microns by a combination of irradiation by electrons or other subatomic particles in the presence of oxygen or air and concurrent or subsequent heating at temperatures below the melting point of the material. The preferred effective and economic range of irradiation, heat and time at temperature is approximately 50–150 Mrads, 150° F. to 600° F. for at least about one-half hour depending upon desired average particle size and melt flow characteristics and acceptable yields of the powders.

Previous attempts to employ aqueous polyfluorocarbon dispersions in blade coating processes have produced unacceptable adhesion or required unacceptably high force to cut hair. Furthermore, the polyfluorocarbon coating would wear off too rapidly as evidenced by a significant increase in the force required to cut or sever beard hair upon subsequent shavings.

An object of the present invention is to provide an environmentally-friendly method of coating razor blade edges with polyfluorocarbons, particularly polytetrafluoroethylene. Specifically, it is an object of the present invention to eliminate chlorofluorocarbon solvents and volatile organic solvents from the blade coating process.

It is also an object of the present invention to provide a razor blade cutting edge which produces substantially equal cutting and wear characteristics as chlorofluorocarbon dispersion-coated blades.

These and other objects will be apparent to one skilled in the art from the following:

SUMMARY OF THE PRESENT INVENTION

The present invention relates to an improved method of forming a polyfluorocarbon coating on a razor blade cutting edge comprising the steps of subjecting a fluorocarbon polymer powder having a molecular weight of at least about 1,000,000 to ionizing radiation to reduce the average molecular weight to from about 700 to about 700,000; dispersing the irradiated fluorocarbon polymer in an aqueous solution; coating said razor blade cutting edge with the dispersion; and heating the coating obtained to melt, partially melt or sinter the fluorocarbon polymer.

DETAILED DESCRIPTION OF THE PRESENT INVENTION

All percentages and ratios described herein are on a weight basis unless otherwise indicated.

As used herein the term "razor blade cutting edge" includes the cutting point and facets of the blade. Applicant recognizes that the entire blade could be coated in the manner described herein; however, an enveloping coat of this type is not believed to be essential to the present invention.

Also, the terms "ionizing radiation" or "irradiated", as used herein, refers to the emission of X-rays, Beta-rays, Gamma-rays, electrons or positrons. Gamma radiation is preferred.

Various methods have been proposed in the past for preparing and utilizing aqueous dispersions of fluorocarbon polymer to coat razor blade cutting edges. All of these methods invariably produced a blade which rapidly decreased in cutting effectiveness. Surprisingly, applicant has discovered that when irradiated fluorocarbon polymer, particularly irradiated polytetrafluoroethylene, is utilized, the blades exhibit a significant improvement in long-term effectiveness compared with prior art aqueous systems. The blades produced by the present invention require much less force to cut water-softened hair. This reduction in cutter force persists during several successive shaves with the same blade cutting edge.

According to the present invention, an aqueous dispersion is prepared from an irradiated fluorocarbon polymer. The preferred nonirradiated fluorocarbon polymers (i.e., starting material) are those which contain a chain of carbon atoms including a preponderance of $-CF_2-CF_2-$ groups, such as polymers of tetrafluoroethylene, including copolymers such as those with a minor proportion, e.g. up to 5% by weight of hexafluoropropylene. These polymers have terminal groups at the ends of the carbon chains which may vary in nature, depending, as is well known, upon the method of making the polymer. Among the common terminal groups of such polymers are, $-H$, $-COOH$, $-Cl$, $-CCl_3$, $-CFClCF_2Cl$, $-CH_2OH$, $-CH_3$ and the like. While the precise molecular weights and distribution of molecular weights of the preferred polymers are not known with certainty, it is believed that they have molecular weights over 1,000,000. The preferred chlorine-containing polymers are those containing from 0.15 to 0.45% by weight of chlorine (which is present in the terminal groups). There may be used mixtures of two or more fluorocarbon polymers, provided the mixtures have melt and melt flow rate characteristics as specified above, even though the individual polymers making up the mixture do not possess these characteristics. The most preferred starting material is polytetrafluoroethylene.

According to the present invention, there is provided a method of forming a polyfluorocarbon coating on a razor blade cutting edge, which comprises subjecting the abovementioned fluorocarbon polymer starting material having a molecular weight of at least 1,000,000 in dry powder form, to ionizing irradiation to reduce the average molecular weight of the polymer to from about 700 to about 700,000, preferably to from about 700 to about 51,000 and most preferably to about 25,000, forming a dispersion of the irradiated polymer in an aqueous medium, spraying the dispersion on to a razor blade cutting edge and heating the coating obtained to cause the polymer to adhere to the blade edge.

The heating of the coating is intended to cause the polymer to adhere to the blade. The heating operation can result in a sintered, paritally melted or melted coating. A partially melted or totally melted coating is preferred as it allows the coating to spread and cover the blade more thoroughly. For more detailed discussions of melt, partial melt and sinter, see *McGraw-Hill Encyclopedia of Science and Technology*, Vol. 12, 5th edition, pg. 437 (1902), incorporated herein by reference.

The radiation dose is preferably from 20 to 80 megarad and the ionizing radiation is preferably by gamma rays from a $Co^{60}$ source. The polyfluorocarbon is preferably polytetrafluoroethylene and irradiation is preferably effected to obtain a telomer having an average molecular weight of about 25,000.

For the purpose of forming the dispersion which is sprayed onto the cutting edges, the irradiated polyfluorocarbon should have a fine particle size, preferably an average particle size of not more than about 100 microns. Powdered polyfluorocarbon starting material is normally available as a coarser material than this and it may be ground to this fineness either before or after the irradiation step, preferably the latter. Typically, the level of the polyfluorocarbon, in the dispersion is from about 0.5% to about 2.0% (wt), preferably from about 0.7% to about 1.0% (wt).

In a preferred embodiment, the particle size range is from about 2 μm to about 8 μm. For these particles a wetting agent is required. Generally, the wetting agents for use in the present invention may be selected from the various surface active materials which are available for use in aqueous, polymeric dispersions. Such wetting agents include alkali metal salts of dialkyl sulfosuccinates, soaps of higher fatty acids, fatty amines, sorbitan mono- and di-esters of fatty acids and their polyoxyalkyleneether derivatives, alkali metal salts of alkylarylsulfonates, polyalkyleneether glycols and the mono- and di-fatty acid esters of said glycols. The preferred wetting agents for use in the present invention are the nonionics and more particularly the alkylphenylpolyalkyleneether alcohols such as Triton X-100 and Triton X-114 sold by Union Carbide, Ipegal CO-610 sold by Rhone-Poulenc and Tergitol 12P12 sold by Union Carbide Company. Especially useful results have been obtained with the Tergitol 12P12 which is dodecylphenylpolyethyleneether alcohol containing 12 ethylene oxide groups. Generally, the amount of wetting agent employed may be varied. Usually, the wetting agent is used in amounts equal to at least about 1% by weight of the fluorocarbon polymer, preferably at least about 3% by weight of the fluorocarbon polymer. In preferred embodiments, the wetting agent is used in amounts ranging between about 3% to about 50% by weight of the polymer with lower levels of wetting agent being desirable. Particularly good results were obtained using between about 3% to about 6%.

Nonionic surfactants are often characterized in terms of their HLB (hydrophile-lipophile balance) number. For simple alcohol ethoxylates, the HLB number may be calculated from $$HLB = E/5$$

where E is the weight percentage of ethylene oxide in the molecule.

Essentially, any wetting agent with a Hydrophile-Lipophile Balance number of from about 12.4 to about 18, preferably from about 13.5 to about 18.0, can be utilized in the present invention. For a further discussion of HLB numbers see Kirk-Othmer, *Encyclopedia of Chemical Technology*, Vol. 22, pp 360-362, incorporated herein by reference.

The dispersion may be applied to the cutting edge in any suitable manner to give as uniform a coating as possible, as for example, by dipping or spraying; nebulization is especially preferred for coating the cutting edges, in which case, an electrostatic field is preferably employed in conjunction with the nebulizer in order to increase the efficiency of deposition. For further discussion of this electrostatic spraying technique, see U.S. Pat. No. 3,713,873 to Fish, issued Jan. 30, 1973, incorporated herein by reference. Preheat of the dispersion may be desirable to facilitate spraying, the extent of preheating depending on the nature of the dispersion. Preheating of the blades to a temperature approaching the boiling point of the volatile liquid may also be desirable.

In any event the blades carrying the deposited polymer particles on their cutting edges must be heated at an elevated temperature to form an adherent coating on the cutting edge. The period of time during which the heating is continued may vary widely, from as little as several seconds to as long as several hours, depending upon the identity of the particular polymer used, the nature of the cutting edge, the rapidity with which the blade is brought up to the desired temperature, the temperature achieved, and the nature of the atmosphere in which the blade is heated. While the blades may be heated in an atmosphere of air, it is preferred that they be heated in an atmosphere of inert gas such as helium, nitrogen, etc., or in an atmosphere of reducing gas such as hydrogen, or in mixtures of such gases, or in vacuo. The heating must be sufficient to permit the individual particles of polymer to, at least, sinter. Preferably, the heating must be sufficient to permit the polymer to spread into a substantially continuous film of the proper thickness and to cause it to become firmly adherent to the blade edge material.

The heating conditions, i.e., maximum temperature, length of time, etc., obviously must be adjusted so as to avoid substantial decomposition of the polymer and/or excessive tempering of the metal of the cutting edge. Preferably the temperature should not exceed 430° C.

The following specific examples illustrate the nature of the present invention. The quality of the first shave obtained with blades of each of the following examples is equal to the quality obtained with the fluorocarbon-polymer-coated blades manufactured with a chlorofluorocarbon solvent presently available; and the decrease in quality with successive shaves in the case of blades of each particular example is less than the decrease in quality in the case of the fluorocarbon polymer-coated blades manufactured with an aqueous solvent previously known.

EXAMPLE 1

Polytetrafluoroethylene powder with an average molecular weight of about 3 million is subjected to gamma irradiation so that the dosage received was 25 megarads and the number-average molecular weight is about 25,000 as calculated by the method described in Sewa et al., J. App. Polymer Science, 17 3258 (1973), incorporated herein by reference.

EXAMPLE 2

A dispersion containing 1% by weight of the irradiated material from Example 1 ground to a particle size of from about 2μm to about 8μm and 0.03% of Triton X-100 brand wetting agent (Union Carbide) in 50° C. water is prepared and homogenized with a blender. Stainless steel razor blade cutting edges are then sprayed electrostatically with the dispersion. After drying, the coating on the blade edges is heated in nitrogen at 650° F. for 35 minutes. The blades so treated exhibit equivalent blade performance and same coating durability as similar blades which had been treated the same way with commercial nonirradiated telomer dispersed in trichlorotrifluoroethane solvent.

EXAMPLE 3

A dispersion containing 0.7% by weight of the irradiated material of Example 1, 50° C. water and 0.05% of Brij58 brand wetting agent (ICI Americas) is prepared and homogenized with a blender. Stainless steel razor blade cutting edges are then sprayed electrostatically with the dispersion. After drying, the coating on the blade edges is sintered in nitrogen at 650° F. for 35 minutes. The blades so treated exhibit equivalent blade performance and the same coating durability as similar blades which had been treated the same way with commercial, nonirradiated telomer in isopropanol or trichlorotrifluoroethane.

What is claimed is:

1. A method of forming a polyfluorocarbon coating on a razor blade cutting edge comprising the steps of:
   (a) subjecting a tetrafluoroethylene polymer powder having an average molecular weight of at least about 1,000,000 g/mol to a dose of ionizing radiation of from about 20 to about 80 megarads to reduce the average molecular weight from about 700 to about 700,000
   (b) dispersing the irradiated fluorocarbon polymer in an aqueous solution which is free of chlorofluorocarbon solvents;
   (c) coating said razor blade cutting edge with the dispersion; and
   (d) heating the coating sufficiently to adhere the fluorocarbon polymer to the blade edge.

2. A method to claim 1 where the heating of step (d) is sufficient to melt, partially melt or sinter the polymer.

3. A method according to claim 2 where the heating of step (d) is sufficient to melt or partially melt the polymer.

4. A method according to claim 3 wherein the tetrafluoroethylene polymer of step (a) is reduced to an average molecular weight of from about 700 to about 51,000 g/mol by said ionizing radiation.

5. A method according to claim 4 wherein the tetrafluoroethylene polymer is irradiated in a dry powder form.

6. A method according to claim 5 wherein the irradiated tetrafluoroethylene polymer of step (b) has an average particle size of not more than about 100 microns.

7. A method according to claim 6 wherein the level of irradiated tetrafluoro dispersed in the aqueous solution of step (b) is from about 0.5% to about 2.0% by weight.

8. A method according to claim 7 wherein the level of irradiated tetrafluoroethylene polymer in the aqueous solution of step (b) is from about 0.7% to about 1.0% by weight.

9. A method according to claim 8 wherein the aqueous solution of step (b) further comprises an effective amount of a wetting agent.

10. A method according to claim 9 wherein the wetting agent has a Hydrophile-Lipophile Balance number of from about 12.4 to about 18.

11. A method according to claim 10 wherein the irradiated polytetrafluoroethylene has a molecular weight of about 25,000, wherein the Hydrophile-Lipophile Balance number is between about 13.5 and 18 and wherein the particle size is from about 2 μm to about 8 μm.

12. A method according to claim 11 wherein the razor blade cutting edge coating is produced by an electrostatic spraying technique.

13. A method according to claim 9 wherein the wetting agent is used in an amount equal to at least about 5% by weight of the irradiated tetrafluoroethylene polymer and the wetting agent is selected from the group consisting of alkali metal salts of dialkyl sulfosuccinates, soaps of higher fatty acids, fatty amines, sorbitan mono- and di-esters of fatty acids and their polyoxyalkyleneether derivatives, alkali metal salts of alkylarylsulfonates, polyalkyleneether glycols and the mono- and di-fatty acid esters of said glycols.

14. A method according to claim 13 wherein the irradiated polytetrafluoroethylene has a molecular weight of about 25,000, and wherein the particle size is from about 2 μm to about 8 μm.

15. A polyfluorocarbon-coated razor blade cutting edge produced by the steps comprising:
   (a) Subjecting a tetrafluoroethylene polymer powder having a molecular weight of at least about 1,000,000 to a dose of ionizing radiation of from about 20 to about 80 megarads to reduce the average molecular weight to from about 700 to about 51,000
   (b) dispersing the irradiated fluorocarbon polymer in an aqueous solution which is free of chlorofluorocarbon solvents.
   (c) coating said razor blade cutting edge with dispersion; and
   (d) heating the coating sufficiently to cause the fluorocarbon polymer to adhere to the blade edge.

16. A polyfluorocarbon-coated razor blade cutting edge according to claim 15 where the heating of step (d) is sufficient to melt, partially melt, or sinter the polymer.

17. A polyfluorocarbon-coated razor blade cutting edge according to claim 16 where the heating of step (d) is sufficient to melt or partially melt the polymer.

18. A polyfluorocarbon-coated razor blade cutting edge according to claim 17 wherein the level of irradiated tetrafluoroethylene polymer dispersed in the aqueous solution of step (b) is from about 0.5% to about 2.0% by weight and wherein the aqueous solution of step (b) further comprises an effective amount of a wetting agent.

* * * * *